United States Patent [19]
Kraine

[11] 3,933,058
[45] Jan. 20, 1976

[54] UNIVERSAL SUPPORT FOR VEHICLE MIRROR

[75] Inventor: Ronald J. Kraine, Garfield Heights, Ohio

[73] Assignee: Tenna Corporation, Cleveland, Ohio

[22] Filed: Feb. 20, 1974

[21] Appl. No.: 444,106

[52] U.S. Cl. .......................................... 74/501 M
[51] Int. Cl.² .......................................... F16C 1/10
[58] Field of Search ............ 74/501 R, 501 M, 489; 248/475 R, 476

[56] References Cited
UNITED STATES PATENTS

| | | | |
|---|---|---|---|
| 3,653,276 | 4/1972 | McIntyre et al. | 74/501 M |
| 3,818,780 | 6/1974 | McIntyre et al. | 74/501 M |

Primary Examiner—Samuel Scott
Assistant Examiner—Frank H. McKenzie, Jr.
Attorney, Agent, or Firm—Baldwin, Egan, Walling & Fetzer

[57] ABSTRACT

A support for effecting limited universal adjustment of a part, comprising a universal joint member formed of moldable vibration absorbing material and comprising an elongated body having bearing means thereon for pivotally mounting the joint on a support for pivotal movement in one plane, and having a mounting plate adjacent an end of the body for attachment to the part to be adjusted, with a flexible connection to the body, for pivotal mounting of the part to be adjusted in another plane. The support is especially useful for mounting a rear view mirror on a vehicle for adjusting movement in both a horizontal plane and a vertical plane.

18 Claims, 8 Drawing Figures

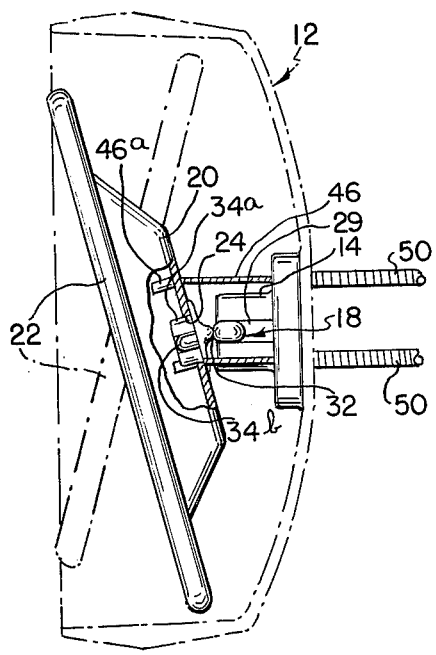
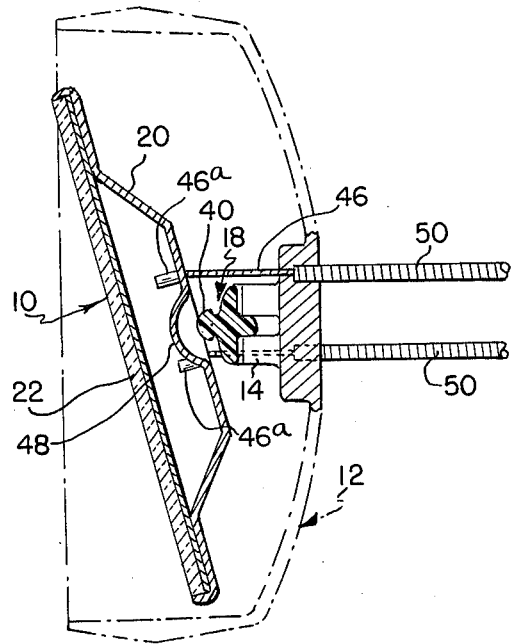
FIG.3  FIG.4
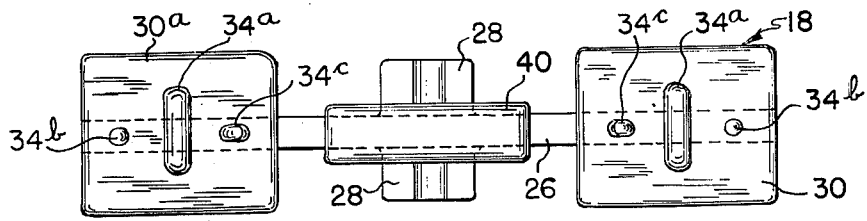
FIG.6
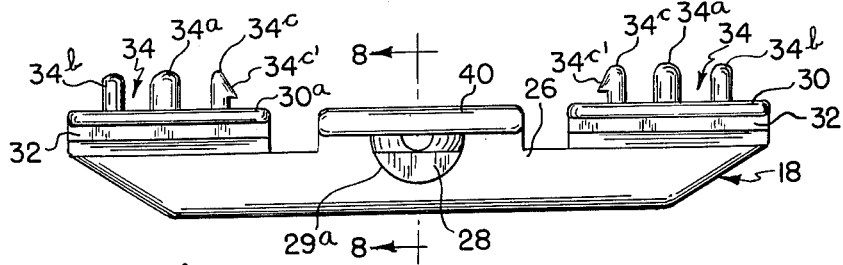
FIG.5
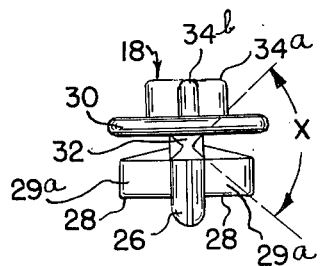
FIG.7
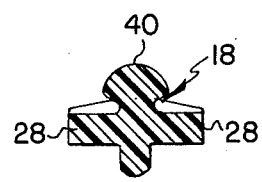
FIG.8

UNIVERSAL SUPPORT FOR VEHICLE MIRROR

This invention relates to a universal support for effecting limited universal adjustment of a part to be adjusted, and more particularly a universal joint of moldable vibration absorbing material, for providing for adjusting movement of the part to be adjusted in a plurality of planes. The support is especially adapted for mounting a rear view mirror for universal adjusting movement on a motor vehicle.

BACKGROUND OF THE INVENTION

Many types of universal supports for effecting limited adjustment of a part, such as a rear view mirror of a vehicle, are known in the prior art. Most of these prior art arrangements are formed of metal components. Such metallic arrangements are not only more expensive, but deteriorate due to corrosion and the like and have very little, if any, vibration absorbing capability.

SUMMARY OF THE INVENTION

The present invention provides a novel support for an item or part to be adjusted, such as for instance an adjustable rear view mirror for mounting on the exterior of a vehicle, and which support includes a molded joint member which is interposed between the member adapted to be adjusted and a support member, for providing for adjusting movement of the part to be adjusted in a plurality of planes.

Accordingly, an object of the invention is to provide a mounting support for a part to be adjusted which support includes a universal joint member formed of moldable vibration absorbing material.

Another object of the invention is to provide a support for movement of the part to be adjusted in a plurality of planes, and wherein the molded member comprises an elongated body having means projecting laterally thereof for pivotally mounting the member on a supporting member for pivotal movement of the attached item to be adjusted in one plane, and including mounting means adjacent an end of the moldable member adapted for coupling to the member to be adjusted, and which is flexibly coupled to the body portion for adjusting or swinging movement of the part to be adjusted in another plane.

Another object of the invention is to provide a novel movable support for a rear view mirror for a vehicle which rear view mirror is adapted for mounting exteriorly of the vehicle, and which is adapted for limited adjusting movement both in a vertical plane and in a horizontal plane.

A still further object of the invention is to provide a support for a rear view mirror which includes a supporting member in which the rear view mirror is disposed, with the support including an elongated universal joint made of moldable vibration absorbing material, and pivotally mounted on the support member for pivotal movement of the mirror in one plane, and having portions thereof flexibly coupled to the body of the universal joint adapted for attachment to the mirror, for pivotal movement of the mirror in another plane.

Other objects and advantages of the invention will be apparent from the following description taken in conjunction with the accompanying drawings wherein:

BRIEF DESCRIPTION OF THE DRAWINGS

FIG. 3 is a side elevational, partially broken view showing the pivotal movement of the vehicle mirror in a vertical plane;

FIG. 4 is a sectional view taken generally along the plane of line 4—4 of FIG. 2, looking in the direction of the arrows;

FIG. 5 is an enlarged, side elevational view of the molded hinge joint member in the support of the invention;

FIG. 6 is a plan view of the FIG. 5 joint member;

FIG. 7 is an end elevational view taken from the right-hand end of FIG. 5;

FIG. 8 is a sectional view taken along the plane of line 8—8 of FIG. 5 looking in the direction of the arrows.

DESCRIPTION OF PREFERRED EMBODIMENT

Figure 1:
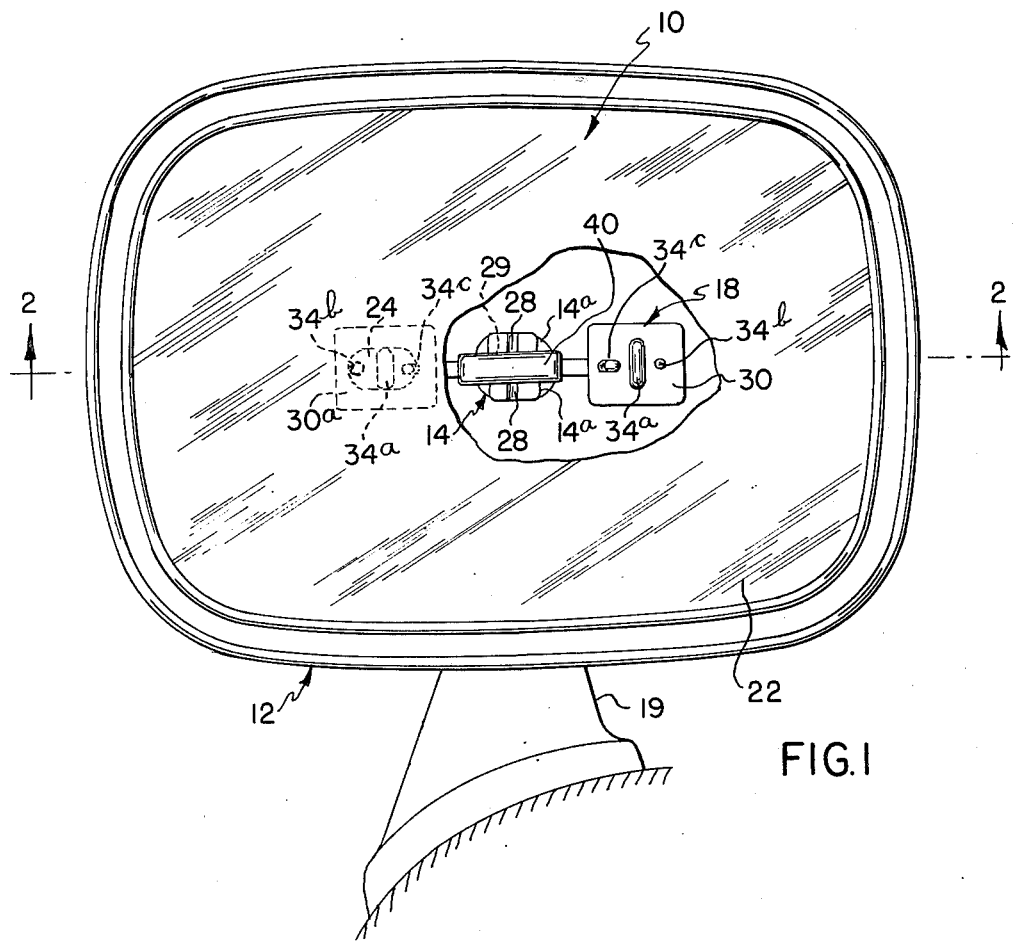
FIG. 1 is a front elevational, partially broken view of the support of the invention, showing the latter attached to a mirror.

Referring now again to the drawings, the support is shown in connection with a mirror adapted for adjustable mounting on a vehicle, such as for instance in a rear view mirror for an automobile. The structure comprises a part 10, in the form illustrated of a mirror, adapted to be adjustably mounted in a support housing member 12. The support member 12 includes projecting, generally bifurcated bearing post 14 which provides spaced segmental bearing seats 14a, for movably supporting the universal joint member 18, which operates to provide for limited adjusting movement of the mirror member 10 in both a horizontal plane and in a vertical plane. Housing 12 may have structure 19 for mounting the support on a vehicle.

Mirror 10 has backing structure 20 secured to the reflecting portion 22 (FIG. 1) which backing structure 20 is adapted to be secured to the universal joint 18, for movement of the mirror 10 with movement of the universal joint member 18. Backing structure 20 has a pair of spaced openings 24 formed therein, for receiving means securing the universal joint 18 to backing structure 20 in a manner to be hereinafter described.

Joint member 18 may be formed of any suitable material, but is preferably formed of plastic material such as for instance nylon. Member 18 comprises an elongated body portion 26 (FIGS. 6 and 7) having laterally projecting pivots 28 extending from opposite sides of body portion 26. The lower portion of body portion 26 of the universal joint member 18 is adapted to be received in the slotted area 29 of the bearing post 14 on support member 12, for guiding pivotal movement of the universal joint with respect to bearing seats 14a, during adjusting movement of the mirror in a generally horizontal plane, on the support. Pivots 28 preferably have a semi-cylindrical configuration 29a (FIG. 5) and are adapted for bearing coaction with aforementioned bearing seats 14a.

Adjacent the ends of the body portion 26 of the universal joint 18 are disposed a pair of plate sections 30, 30a, secured to the body portion by means of notched hinge sections 32 as can be best seen in FIG. 7.

The notched sections 32 are preferably formed with approximately a 90° angle X (FIG. 7) and provide a flexible connection of each of the mirror attaching plate sections 30,30a to the body portion 26 of the universal joint. The attaching plate sections 30,30a are preferably pivotable approximately 60° (30° to either side of the center plane) to give adjustment movement to the mirror in a generally vertical plane, as illustrated for instance in FIGS. 3 and 4 of the drawings.

Figure 2:
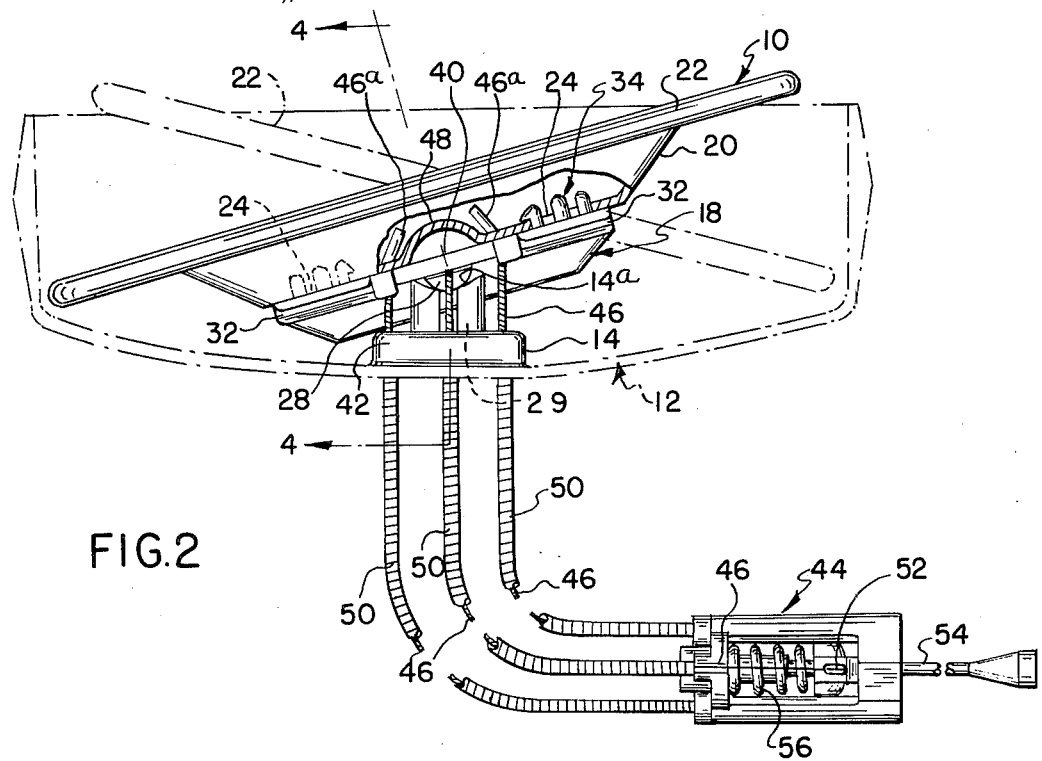
FIG. 2 is a top plan, partially broken view showing in phantom lines a position to which the mirror can be swung in a generally horizontal plane; a manual actuator and control cables are shown attached to the mirror for selectively moving the latter.

Projecting outwardly from the frontal surface of each of the plates 30,30a are projection means 34 for attaching the universal joint to the backing structure 20 of the mirror assembly. As can be best seen in FIG. 2, projecting means 34 comprises a central projections 34a of approximately the same width dimension as the dimension of the minor axis of aforementioned opening 24 in backing structure 20 of the mirror assembly, and end projections 34b and 34c. Projection 34b is adapted to abut the corresponding end of opening 24 at the major axis of the latter, while projection 34c has a hook-like head for overlapping coaction with backing structure 20, as can be seen in FIG. 2. The projection means is adapted to be pushed or forced through the confronting opening 24 in the backing structure 20 into snap fastening coaction to position the mirror assembly with respect to the universal joint 18. Projection 34c of the group 34 includes oblique surface 34c' on the hook-like portion thereof, which is adapted for camming coaction with the confronting defining periphery of the opening 24 in the backing plate 20 whereby the projection passes forcibly through the opening and then springs back to normal position, to lock the associated plate section 30 or 30a of the universal joint member to the backing structure 20 of the mirror assembly. Since the projection means 34 have a certain amount of flexibility or "give," the projections can be forced through the opening in the backing structure 20, after which the hook-like projections 34c overlap the interior of the backing mechanism 20 in generally snug relation, to retain the universal joint to the mirror assembly.

The central portion of joint member 18 preferably includes anti-overload beam section 40 which is adapted to engage the mirror assembly backing member 20, as shown in FIG. 2, and prevent over-loading of the notched hinged sections 32, thereby preventing premature failure of the latter The pivotal movement of the mirror assembly 10 and attached joint 18 with respect to the support member 12, may be limited by engagement of the body 26 of the joint with the widened base portion 42 of the bearing post 14, or may be limited by engagement of the mirror assembly with a confronting interior surface of support member 12.

Any suitable mechanism may be provided for causing actual adjusting movement of the mirror assembly with respect to the support member 12. Many such arrangements, both manual and power operated are known in the art.

In the embodiment illustrated, a manual arrangement 44 (FIG. 2) is shown including movable spring loaded actuating wires 46, attached as at 46a to the mirror backing 20 in a triangular-like pattern about indentation section 48 of the mirror backing member. Such movable wires 46 are housed in and pass through flexible housing cable 50, and then are anchored as at 52 (FIG. 2) to manually pivotable actuator knob 54, which is spring loaded, as at 56 in known manner, to maintain tension on the wires 46. The tensioned wires thus hold the pivots 28 of the universal joint 18 against the pivot seats 14a of the support member 12. U.S. Pat. No. 3,013,392 issued Dec. 19, 1961 discloses another spring arrangement for holding a mirror assembly in place.

From the foregoing description and accompanying drawings it will be seen that the invention provides a novel support for providing limited universal adjustment of a part, such as for instance a rear view mirror for a vehicle, and which includes a universal joint member formed of moldable vibration absorbing material which has bearing means thereon for pivotal movement of the mirror and attached joint in one plane and which has coupling means flexibly attached to the body of the joint for pivotal movement of the mirror in another plane. The flexible vibration absorbing joint can be expeditiously produced using mass production techniques.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a support for effecting limited adjustment in a plurality of planes of a part to be adjusted, comprising, a first supporting member, a second member generally spaced from the first member, a universal joint means connecting said members and effecting limited movement in a plurality of planes therebetween, said joint means being formed of vibration absorbing material and comprising pivotal bearing means coacting with bearing means on said first member for swinging movement of said second member and said joint means relative to said first member in one plane, and said joint means including flexible means for swinging movement of said second member relative to said first member in another plane.

2. A support in accordance with claim 1 wherein said second member comprises a rear view mirror for a vehicle and said first member comprises a housing for said mirror, said housing including means for mounting said housing on the vehicle.

3. A support in accordance with claim 1 wherein said joint means comprises a member formed of plastic material, said joint member including an elongated body, said pivotal bearing means comprising pivots projecting laterally of said body for pivotal movement of said joint member and said second member in said one plane, and said flexible means comprising sections of reduced thickness formed on said joint member and operably coupled to said second member for permitting swinging movement of said second member relative to said first member in said other plane.

4. A support in accordance with claim 3 wherein said joint member is formed of nylon and includes mounting plates adjacent opposite ends thereof, said sections of reduced thickness comprising V-shaped notches formed in said member adjacent the ends thereof and securing said mounting plates to said body, said mounting plates having means thereon for attachment to said second member whereby said mounting plates swing with said second member and relative to said body upon movement of said second member in said other plane relative to said first member.

5. A support in accordance with claim 3 wherein said mounting plates each comprise projections extending therefrom received through an opening in a backing portion of said second member, said opening being of elliptical configuration and one of said projections being of a width substantially equal to the minor axis of said opening, other of said projections being disposed adjacent the ends of the major axis of the respective opening, and means on at least one of said end projections for engaging in overlapping coaction with the periphery of the opening, to retain the joint member assembled with said backing portion.

6. A support in accordance with claim 3 wherein said body of said joint member includes anti-overload means thereon, for preventing overloading of said flexible sections of said joint member by the force exerted by said second member on said joint member.

7. A support in accordance with claim 3 wherein said bearing means on said first member includes means for guiding the pivotal movement of said joint member and thus the pivotal movement of the attached second member with respect to said bearing means on said first member.

8. A support in accordance with claim 6 wherein said anti-overload means comprises a beam section on said joint member engaging with said second member so that the force of said second member against said flexible sections of said joint member is limited by said beam section.

9. A support in accordance with claim 1 wherein said joint means comprises an elongated body portion, said pivotal bearing means comprising arms projecting laterally from said body portion and defining semi-cylindrical bearing surfaces thereon adapted for bearing coaction with said bearing means on said first member, said joint means having mounting means including projections for coupling said joint means to said second member in snap fastened relation, said flexible means flexibly connecting said mounting means to said body portion and comprising notched sections possessing flexibility for movement of said mounting means relative to said body portion thereby providing for swinging movement of said second member relative to said first member in said other plane.

10. A universal hinge joint for use in a support for effecting limited adjustment in a plurality of planes of a part to be adjusted comprising, a member formed of vibration absorbing material, said member including a body, mounting means adjacent at least one end of said body for supporting a part to be adjusted, bearing means on said body for pivotally mounting said hinge joint on a support for pivotal movement in one plane, and flexible means coupling said mounting means to said body for pivotal movement of said mounting means in another plane.

11. A hinge joint in accordance with claim 10 wherein said mounting means comprises plate sections formed adjacent opposite ends of said body, said plate sections having means thereon for coupling the part to be adjusted to the respective plate section, and said bearing means comprising semi-cylindrical laterally projecting pivots adapted for bearing coaction with complementary bearing means on said support for pivotally mounting said hinge joint on the support for movement in said one plane.

12. A hinge joint in accordance with claim 11 wherein said flexible means comprises an area of reduced width flexibly connecting the respective of said plate sections to said body, said means for coupling the part to be adjusted to the respective plate section comprising projections formed on said plate sections and projecting outwardly therefrom.

13. A hinge joint in accordance with claim 12 wherein said projections comprise means for hook fastening coaction with the part to be adjusted, for coupling the latter to said plate sections of the hinge joint.

14. A hinge joint in accordance with claim 10 wherein said bearing means comprises laterally spaced arms extending laterally from opposite sides of said body generally centrally thereof in a lengthwise direction, said arms being of semi-cylindrical configuration in end elevation with the semi-cylindrical surface being disposed on the same side of each of said arms, said semi-cylindrical surface being adapted for bearing relation with a support member for adjustment of a part to be adjusted relative to the support member, said flexible means comprising a notched section disposed between said body portion and said mounting means and coupling the latter together in flexible relation.

15. A hinge joint in accordance with claim 14 wherein said notch section defines an angle of approximately 90° in end elevation.

16. A hinge joint in accordance with claim 12 including anti-overload means on said body for preventing overloading of said flexible sections.

17. A hinge in accordance with claim 10 wherein said hinge joint is formed of polymeric material such as for instance nylon.

18. In a support for effecting limited adjustment of a part to be adjusted in a plurality of planes comprising, a supporting part, universal joint means coacting between said parts for effecting limited movement of said adjustable part relative to said supporting part, said joint means being formed of vibration absorbing material and comprising bearing means coacting with bearing means on one of said parts for swinging movement of said adjustable part relative to said supporting part in one of said planes, said joint means including flexible means for swinging movement of said adjustable part relative to said supporting part in another plane.

* * * * *